US010670046B2

(12) United States Patent
Aggarwal

(10) Patent No.: US 10,670,046 B2
(45) Date of Patent: Jun. 2, 2020

(54) HIGH FLOW LOW PRESSURE SUCTION DEVICE

(71) Applicant: Ujjawal Aggarwal, Lucknow (IN)

(72) Inventor: Ujjawal Aggarwal, Lucknow (IN)

(73) Assignee: WCB ROBOTICS INC., Dover, DE (US)

( * ) Notice: Subject to any disclaimer, the term of this patent is extended or adjusted under 35 U.S.C. 154(b) by 71 days.

(21) Appl. No.: 16/139,139

(22) Filed: Sep. 24, 2018

(65) Prior Publication Data

US 2019/0093670 A1 Mar. 28, 2019

(30) Foreign Application Priority Data

Sep. 25, 2017 (IN) .............................. 201711034004

(51) Int. Cl.
*B62D 57/024* (2006.01)
*B65G 47/91* (2006.01)
(Continued)

(52) U.S. Cl.
CPC ................ *F04D 29/40* (2013.01); *A47L 1/02* (2013.01); *A47L 11/38* (2013.01); *A47L 11/40* (2013.01);
(Continued)

(58) Field of Classification Search
CPC .. A47L 1/02; A47L 11/38; A47L 11/40; A47L 2201/00; B25J 15/0683;
(Continued)

(56) References Cited

U.S. PATENT DOCUMENTS 3,246,711 A * 4/1966 Snoeyenbos ........... B60V 3/025
180/164
3,438,668 A * 4/1969 Williams .............. B66C 1/0268
294/64.3
(Continued)

FOREIGN PATENT DOCUMENTS

DE 102008062343 6/2010

OTHER PUBLICATIONS

International Search Report for corresponding PCT App. No. PCT/IN2018/050249 dated Aug. 13, 2018.

*Primary Examiner* — Igor Kershteyn
(74) *Attorney, Agent, or Firm* — Emerson, Thomson & Bennett, LLC; Roger D. Emerson; Peter R. Detorre

(57) ABSTRACT

The present invention discloses a high flow low pressure suction device. The device is a non-contact suction device based on multiple stage turbulence based low pressure suction mechanism which comprises fan(s) or rotating impeller(s) for drawing air/fluid/slurries operates without any seal between the device and the sucked surface. The device compounds this turbulence based low pressure generation along with Bernoulli's principle to yield a high efficiency suction device. The device implements the above concept by making the air/fluid/slurries flow through two or three zones selected from the acceleration zone(s), turbulence zone(s) (high turbulence zone) and smooth zone(s) (minimum turbulence zone). The device works by pulling the air/fluid/slurries into the vacuum chamber, accelerating the air/fluid/slurries, creating turbulence in the air/fluid/slurries in a thin region near the perimeter in order to cause a drop in pressure and then maintaining pressure over a large bottom area and finally exhausting the air/fluid/slurries through the fan(s)/rotating impeller(s).

25 Claims, 10 Drawing Sheets

Figure 16:
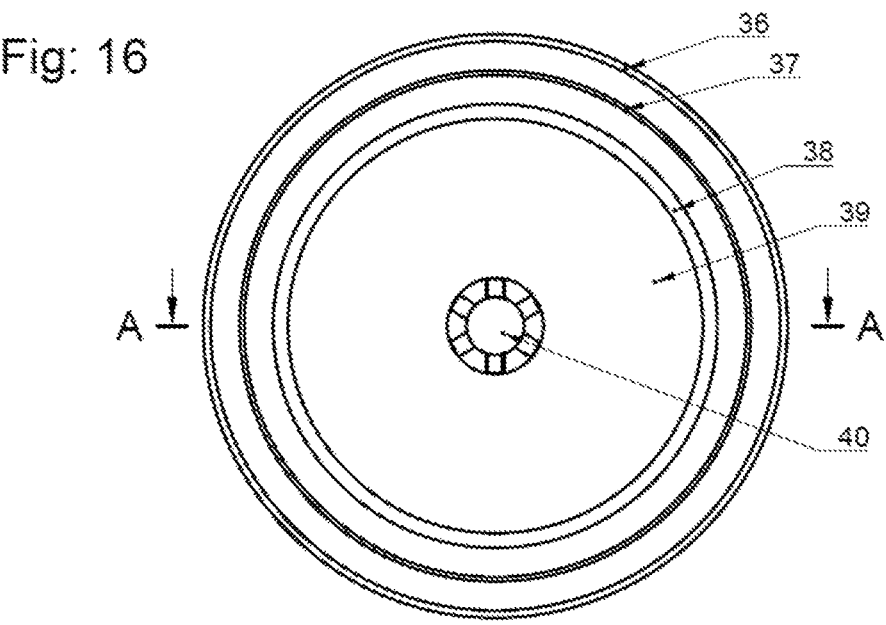

(51) Int. Cl.
*F04D 29/40* (2006.01)
*F04D 13/02* (2006.01)
*F04D 25/08* (2006.01)
*F15D 1/00* (2006.01)
*A47L 1/02* (2006.01)
*A47L 11/38* (2006.01)
*A47L 11/40* (2006.01)
*B25J 15/06* (2006.01)

(52) U.S. Cl.
CPC ........ *B25J 15/0683* (2013.01); *B62D 57/024* (2013.01); *F04D 13/021* (2013.01); *F04D 25/08* (2013.01); *F15D 1/008* (2013.01); *A47L 2201/00* (2013.01); *B65G 47/91* (2013.01)

(58) Field of Classification Search
CPC ..... B62D 57/024; B65G 47/91; F04D 13/021; F04D 25/08; F04D 29/40; F15D 1/008
See application file for complete search history.

(56) References Cited

U.S. PATENT DOCUMENTS

| | | | | |
|---|---|---|---|---|
| 3,466,079 | A * | 9/1969 | Mammel | H01L 21/6838 294/64.3 |
| 3,892,287 | A * | 7/1975 | Bennett | B60V 1/00 180/164 |
| 5,067,762 | A * | 11/1991 | Akashi | B25J 15/0616 271/97 |
| 5,967,578 | A * | 10/1999 | Frey | H01L 21/6838 294/64.3 |
| 7,690,869 | B2 * | 4/2010 | Yo | B65G 49/061 269/20 |
| 7,823,941 | B2 * | 11/2010 | Caldwell | B65G 47/911 294/64.3 |
| 8,715,518 | B2 * | 5/2014 | Kelekar | H01L 21/67051 118/720 |
| 2002/0130524 | A1 | 9/2002 | Mcilwraith et al. | |
| 2006/0144624 | A1 | 7/2006 | Clark et al. | |
| 2011/0192665 | A1 * | 8/2011 | Chen | B25B 11/007 180/164 |

* cited by examiner

Fig:1
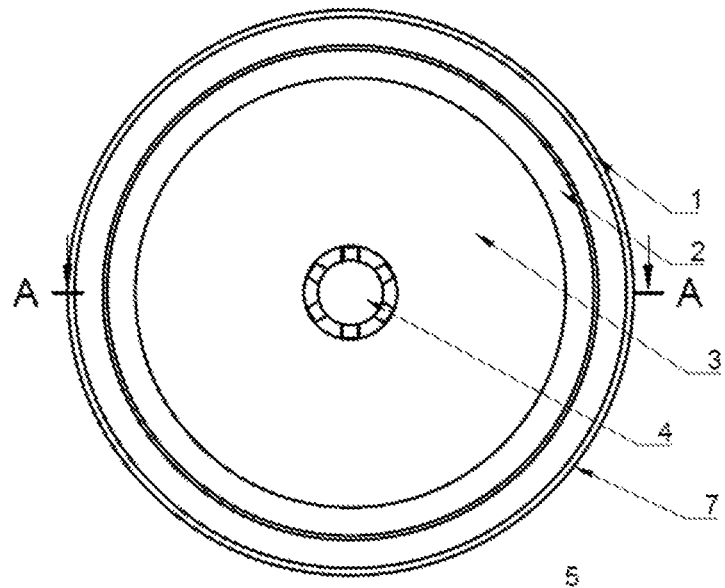
Fig:2
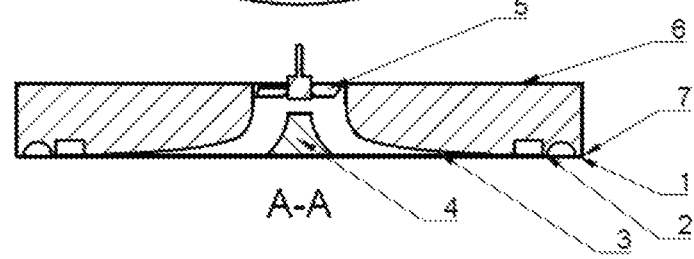
A-A
Fig:3
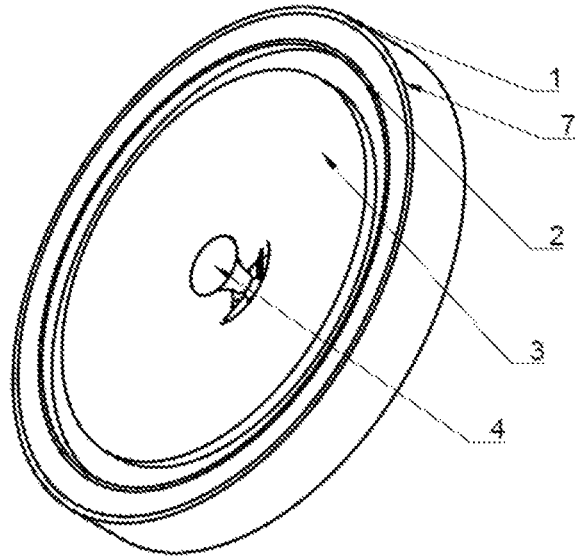

Fig:4
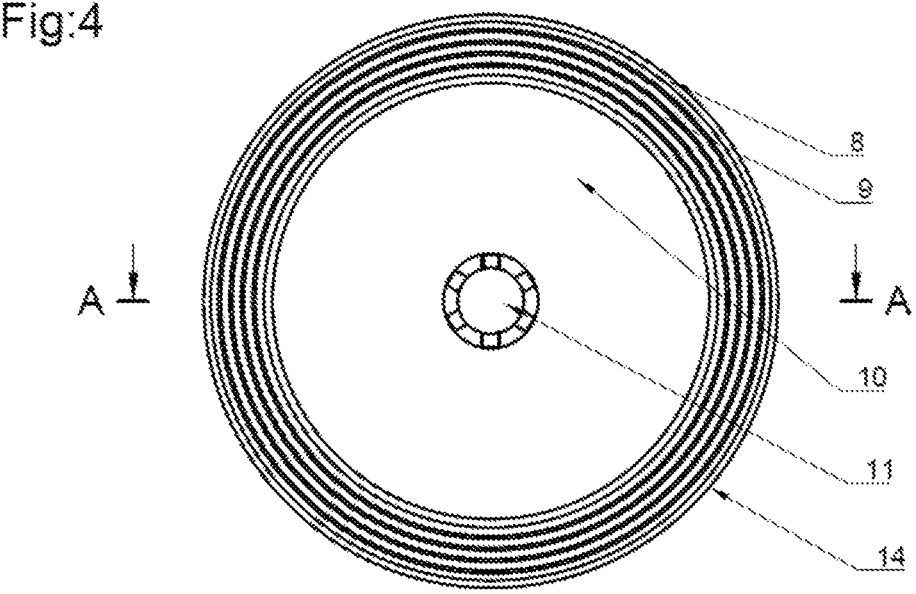
Fig:5
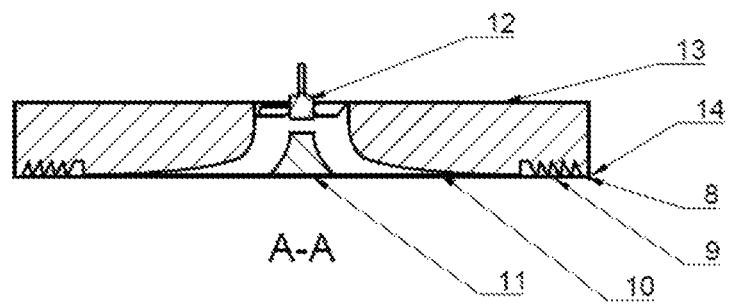
A-A
Fig:6
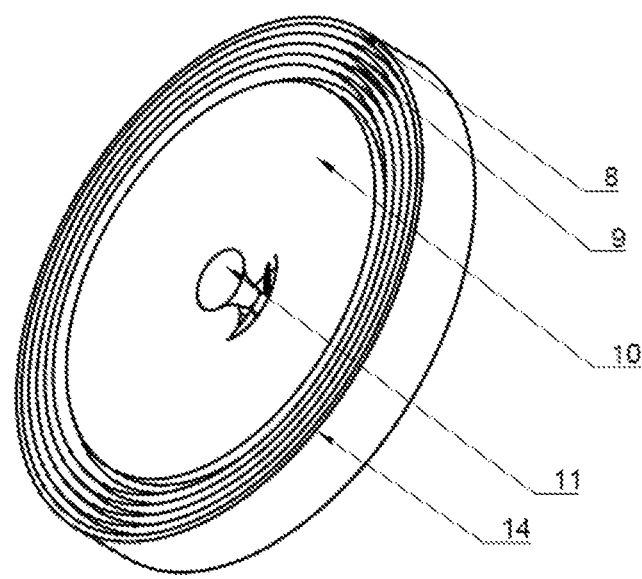

Fig: 7
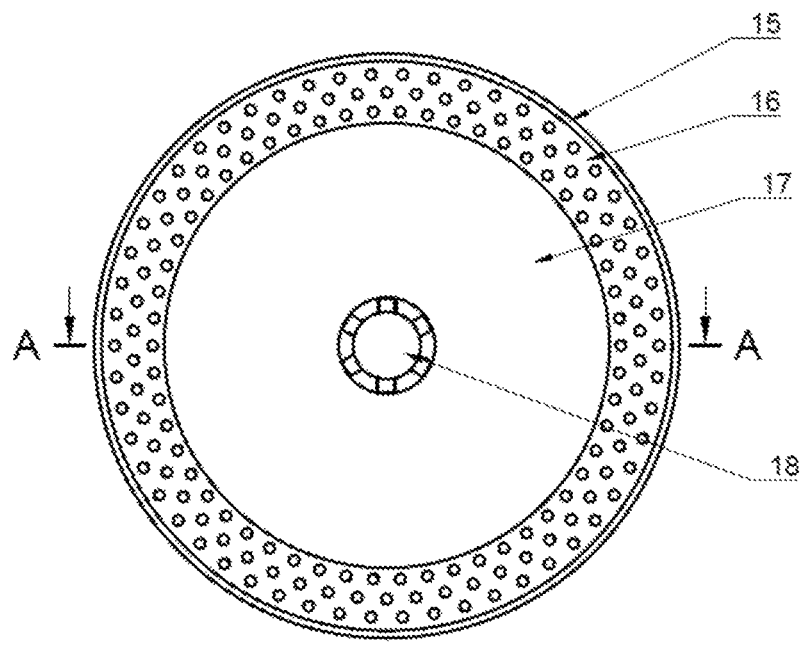
Fig: 8
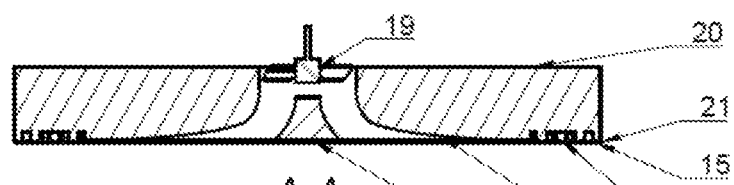
A-A
Fig: 9
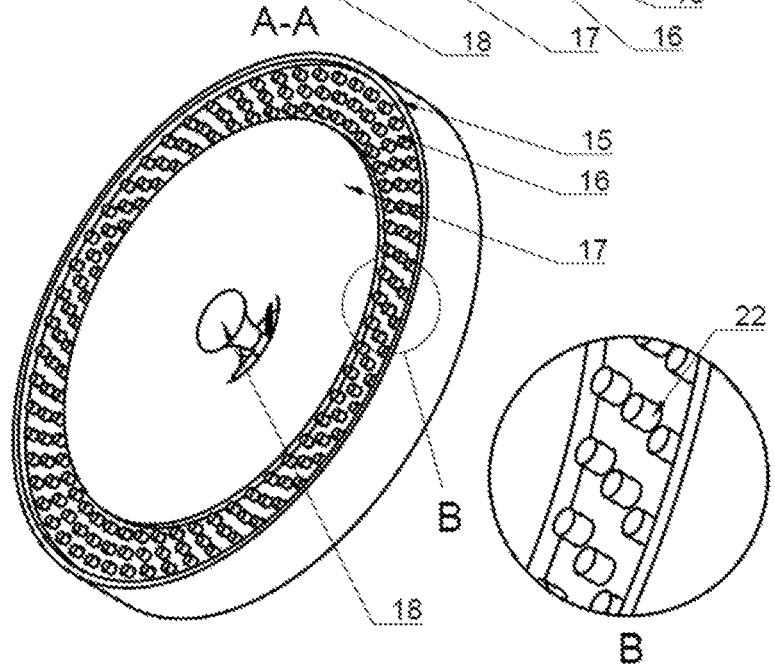

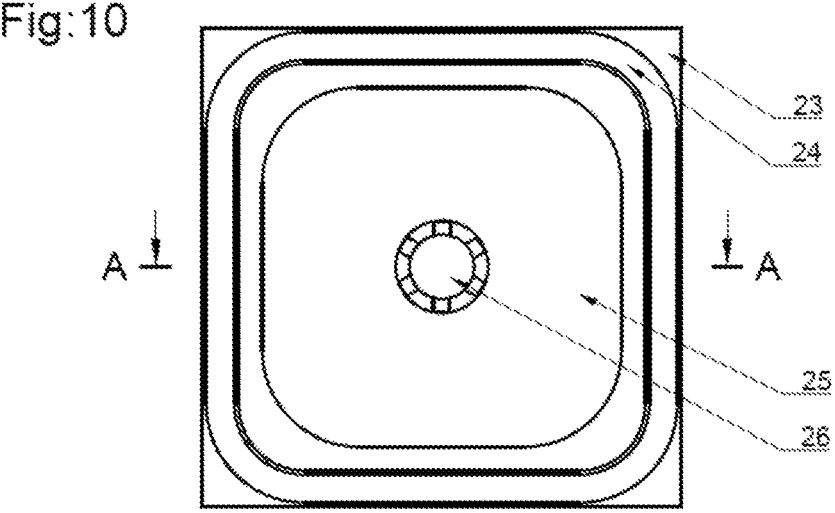
Fig:10
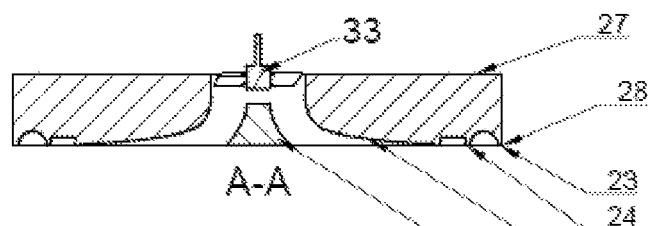
Fig:11
Fig:12
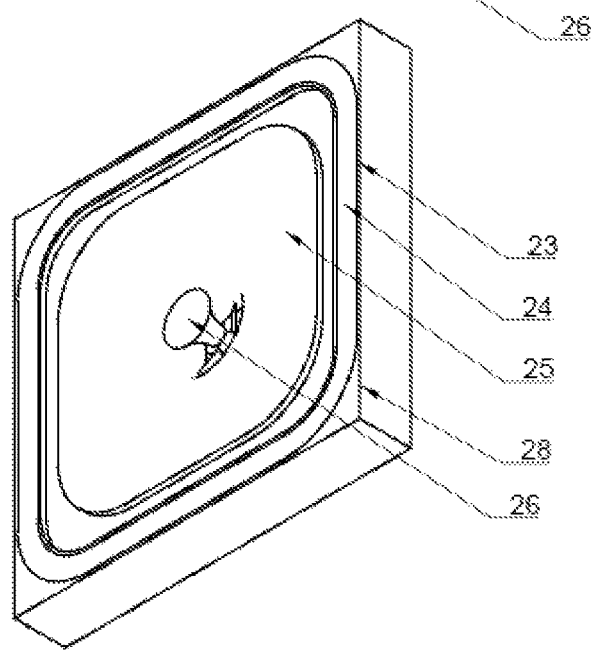

Fig:13
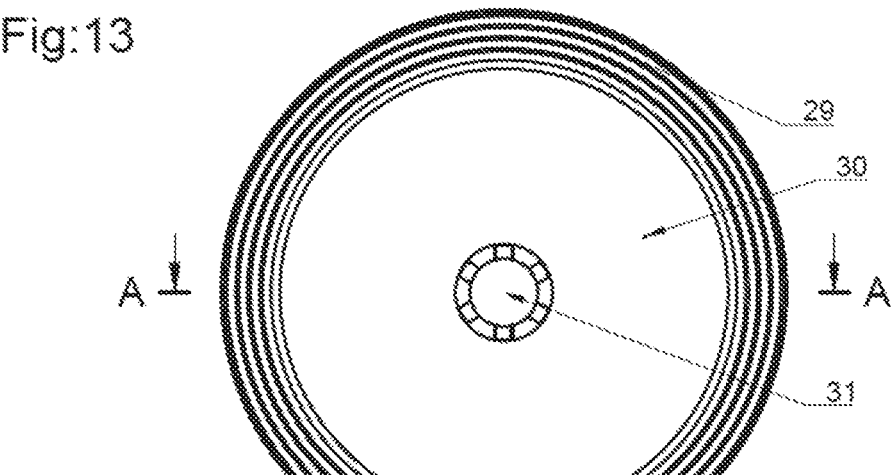
Fig:14
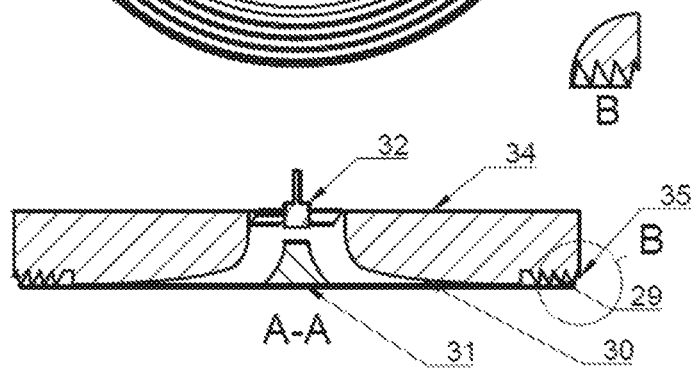
Fig:15
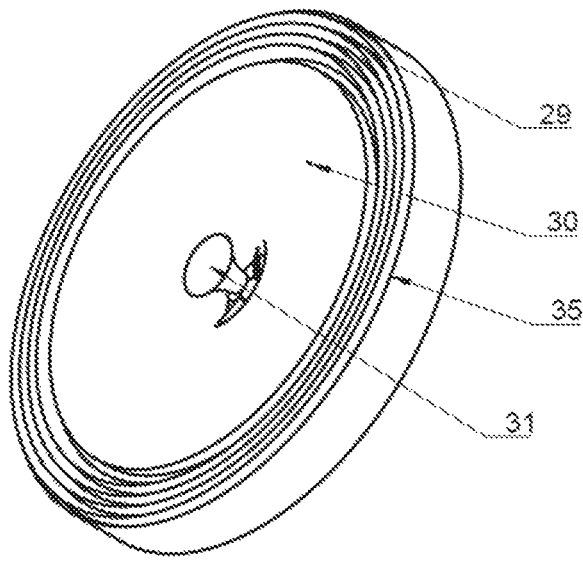

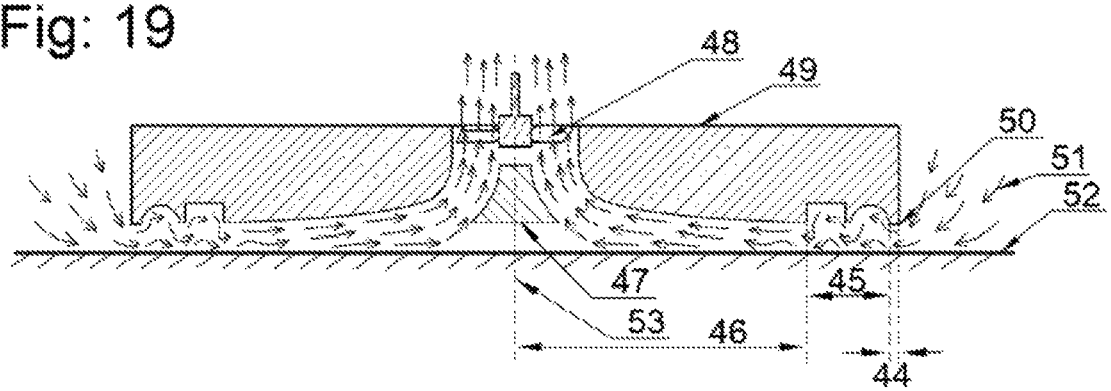
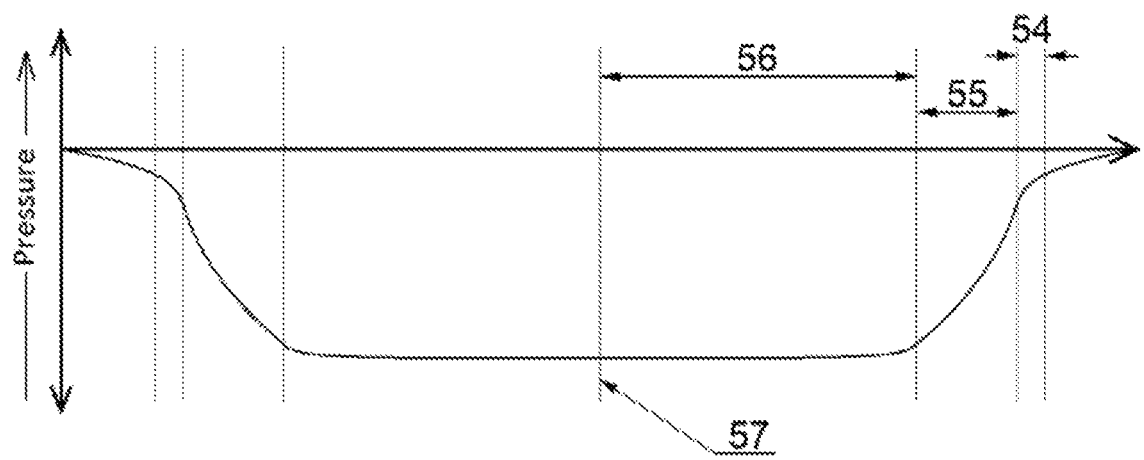

Fig: 21
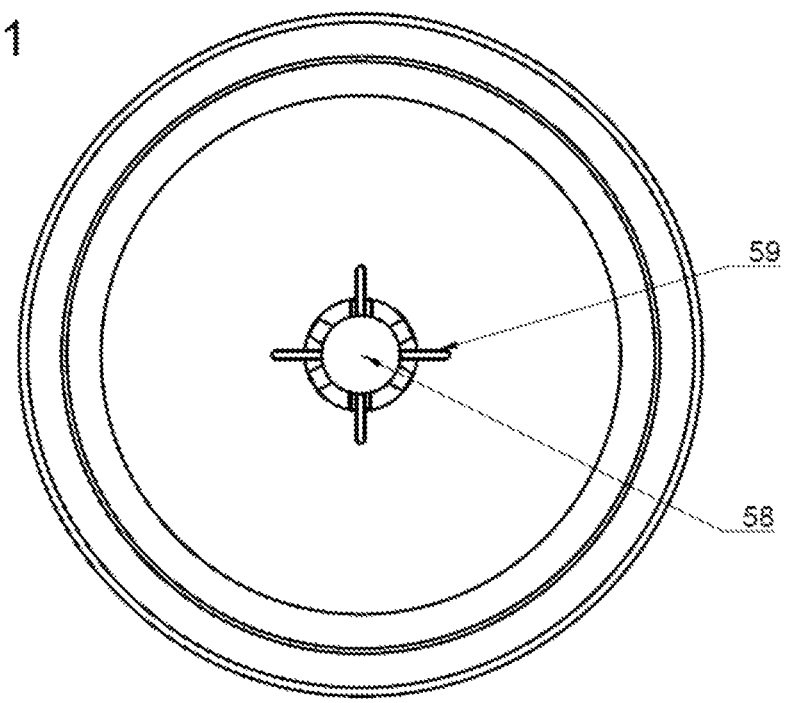
Fig: 22
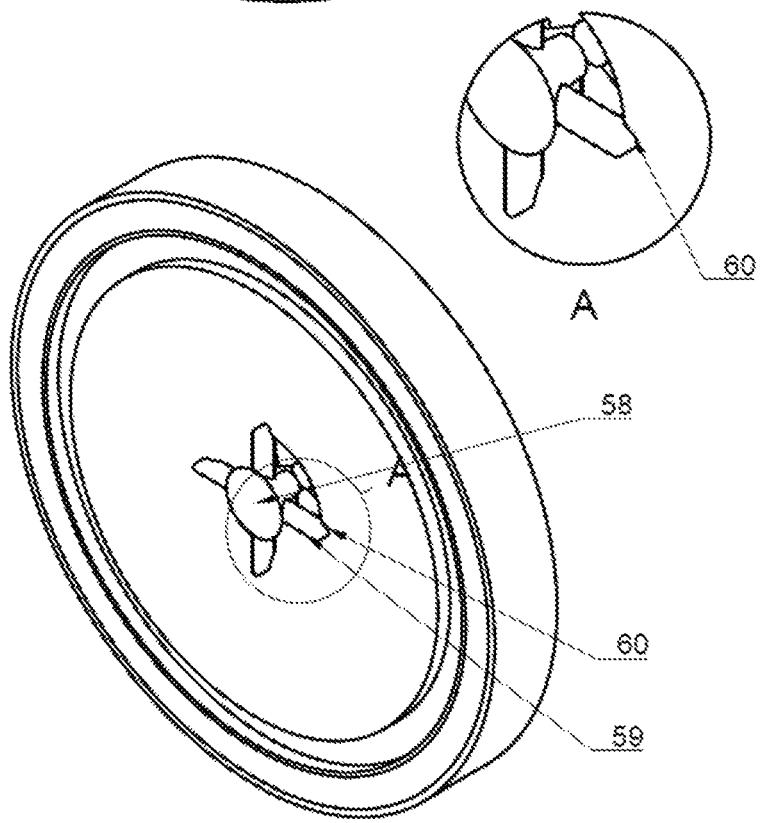

Fig: 23
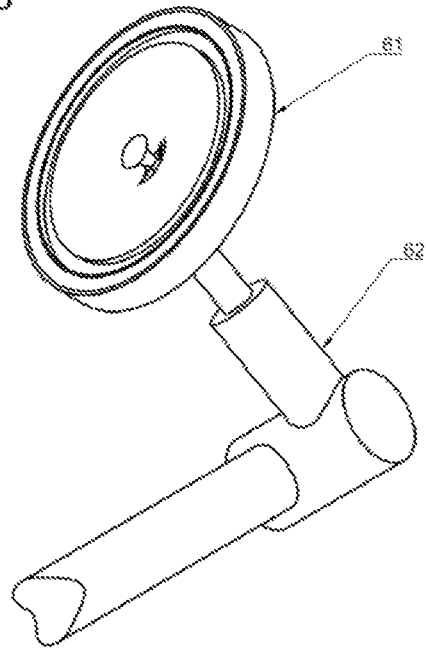
Fig: 24
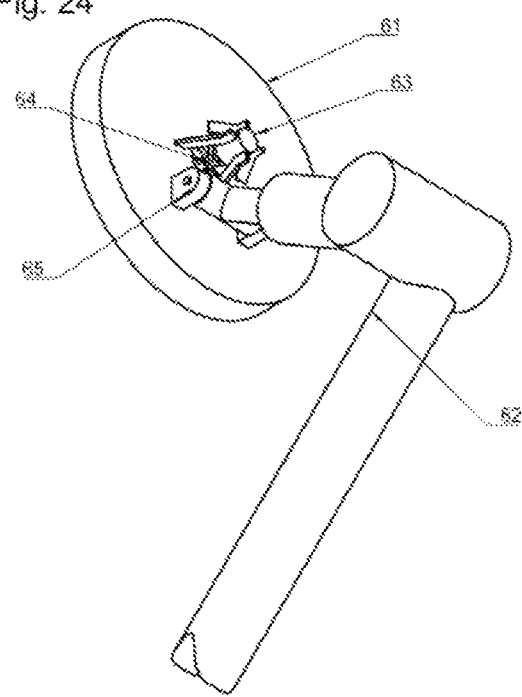

Fig: 25
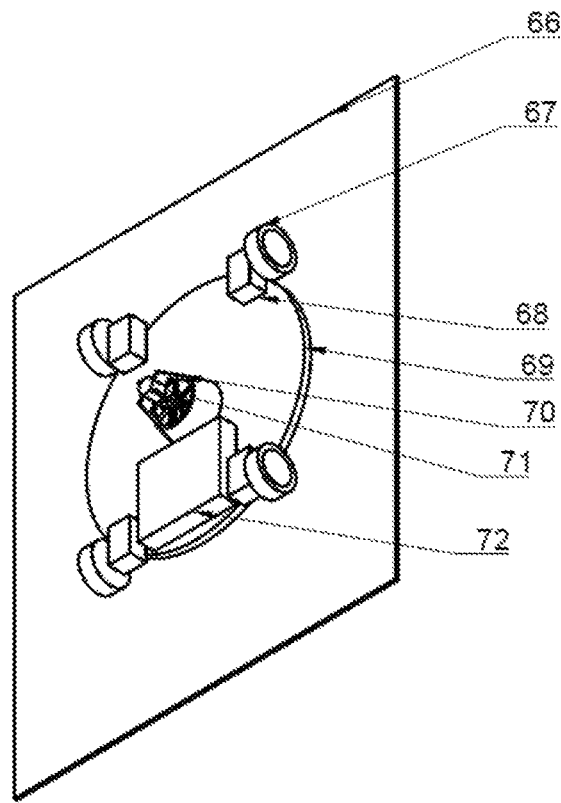
Fig: 26
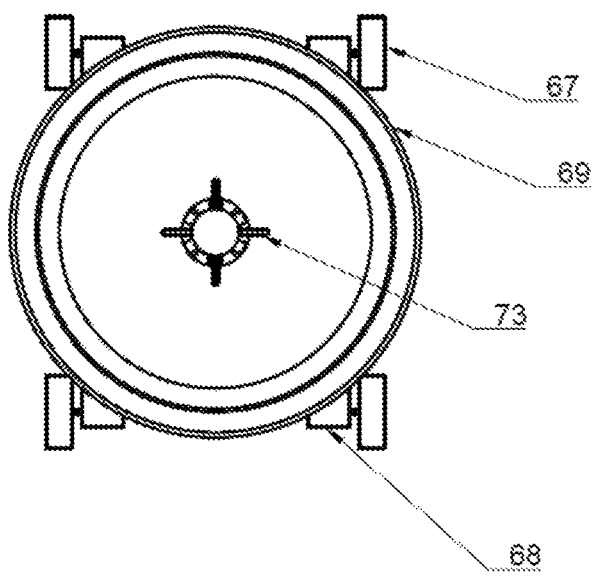

HIGH FLOW LOW PRESSURE SUCTION DEVICE

FIELD OF THE INVENTION

The present invention relates to high flow low pressure suction device. Particularly, the invention belongs to the field of fluid mechanics which describes a suction mechanism and device involving multiple stage turbulence based high flow low pressure suction that does not need to contact the sucked surface. This suction device can be used in wall climbers and other mobile robots or toys for slanted, vertical or upside-down surfaces. The device can also be used as an end effector for a manipulator. Another important use may be in devices requiring high traction such as airplane push-back tractors.

BACKGROUND OF THE INVENTION

The invention relates to the field of high flow low pressure suction device based on non-contact suction mechanisms. These devices have found profound use in mobile robots that are capable of moving on all surfaces regardless of the orientation. Wall climbing robots have commercial uses in making wall painting robots, window cleaning robots, surveillance robots, solar panel cleaning robots, inspection robots in nuclear plants and many any other robotic systems that need to move on upside down surfaces, vertical surfaces or extremely slant surfaces.

Many technologies for adhesion to the surface have been developed like magnetic systems, electrostatic systems etc. each having its own advantages and disadvantages. Of these, the fluid based suction technology can handle a variety of surfaces irrespective of the material nature of the surface. The fluid based suction technology can be widely classified into two categories namely, contact suction systems (use a flexible seal between the robot and the surface) and non-contact systems. The contact systems or suction cups are generally more efficient in terms of force produced per unit energy used. However, these systems are not fit for mobile robots especially on rough surfaces. Suction cups are used in walking like robots and in wheeled robots with dragged seals. This technology faces several problems. One of the major problems is the friction between the rubber skirt (seal (in dragged seal form)) and the surface. This hinders motion and may also leave rubber marks on walls. Also, if due to certain non-uniformity in the surface (on which the robot is moving) the seal leaves contact then the air pressure will be lost and catastrophic failure will result (applicable for both, dragged seal type and the walking type). Flexible and segmented seals have been used to reduce problems on rough surfaces like in U.S. Pat. Nos. 4,095,378, 4,809,383 and 5,014,803, but these are effective to a limited extend only.

The non-contact suction systems are superior to the contact suction systems in context to mobile robots but inherently use much more energy per unit force produced. These systems from prior art are usually based on Bernoulli's principle for creating low pressure. This means they use a large portion of the under surface as a flat surface as in US20110192665A1. The under surface of the suction mechanism/mobile robot in conjugation with the sucked surface forms a venturi duct, as in US20060144624. The device of the present invention does not have a flat under surface and hence the under-surface in conjugation with the sucked surface does not form a venturi duct. The Bernoulli's principle based mechanisms can produce suction from both inward flow of the fluid and outward flow of the fluid and this is a key differentiator in identifying a Bernoulli's principle based system from the device of the present invention. Many prior arts that use the outward flow of air like US20110192665A1 using pressurized air can be found.

The other class of non-contact suction mechanisms is the vortex attractors. These usually have the underbody comprising almost completely of an impeller what pushes the air (or other fluid) out of the region between the underbody and the sucked surface and hence creates a low pressure in the region. The flow is like a vortex. U.S. Pat. Nos. 5,194,032 and 6,565,321 are some examples of vortex attractors. These have high moment of inertia for the impeller and hence have lower response time and huge gyroscopic precession. Also, they always operate in the risk of the impeller striking some surface protrusion hence damaging the surface and the impeller.

The invention described presently uses a radically new approach to creation of suction that is turbulence based suction. The present invention is a non-contact suction mechanism based suction device and hence has superior rough surface performance in comparison to a contact suction mechanism based suction device. The present invention has higher energy efficiency than a Bernoulli's principle based suction device. Also, the mechanism and device has lower sensitivity to surface protrusions as compared to a Bernoulli's principle based suction device/apparatus.

OBJECT OF THE INVENTION

The primary object of the present invention is to design and/or provide high flow low pressure suction device.

One object of the present invention is to design and/or provide a non-contact multiple stage turbulence based high flow low pressure suction mechanism and/or suction device, with superior performance and increased efficiency.

Another object of the present invention is to provide a non-contact suction device involving above concept of suction and/or involving three stages turbulence based high flow low pressure suction mechanism of the present invention.

Another object of the present invention is to provide a non-contact suction device involving above concept of suction and/or involving two stages turbulence based high flow low pressure suction mechanism of the present invention.

Another object of the present invention is to provide a non-contact suction device involving above concept of suction and/or involving more than three stages turbulence based high flow low pressure suction mechanism of the present invention.

A further object of the present invention is to provide a non-contact suction device/system/apparatus with superior performance and increased efficiency that can work with any fluids and slurries including gasses (e.g. air), liquids (e.g. water), or any combination thereof; and that can be used to suck, suspend, hold, lift and interrupt an object and to adhere to a surface; and the device performs robustly in situations of varying roughness and surface texture.

SUMMARY OF THE INVENTION

The present invention discloses high flow low pressure suction device. Particularly, the invention describes a suction mechanism, device and apparatus involving multiple stage turbulence based high flow low pressure suction that does not need to contact the sucked surface. This suction device can be used in wall climbers and other mobile robots or toys for slanted, vertical or upside-down surfaces, as an end effector for a manipulator and also in devices requiring high traction such as airplane pushback tractors.

The non-contact suction device/system/apparatus of the invention has superior performance and increased efficiency that can work with any fluids and slurries including gasses (e.g. air), liquids (e.g. water), or any combination thereof; and that can be used to suck, suspend, hold, lift and interrupt an object and to adhere to a surface; and the device performs robustly in situations of varying roughness and surface texture.

In one aspect, the invention provides a high flow low pressure suction device comprising:
 a base plate, wherein the interior surface of the base plate comprises subdivided flow sections physically created therein (physical zones);
 sucking fan(s) or rotating impeller(s) attached with the base plate facing towards vacuum chamber;
 wherein the sucking fan(s) sucks air or fluid or slurries into the device and into the base plate from the periphery of the base plate, where the interior geometrical design by way of subdivided flow sections of the base plate controls flow speed of air or fluid or slurries; and
 wherein the suction device does not need to contact the sucked surface.

In one embodiment, the base plate comprises multiple subdivided flow sections selected from acceleration zone, turbulence zone and smooth zone.

In one embodiment, the multiple subdivided flow sections present at the interior surface of the base plate comprises one turbulence zone and one smooth zone.

In one embodiment, the multiple subdivided flow sections present at the interior surface of the base plate comprises one acceleration zone, one turbulence zone and one smooth zone.

In one embodiment, the multiple subdivided flow sections present at the interior surface of the base plate comprises two acceleration zones, one turbulence zone and one smooth zone.

In one embodiment, the smooth zone of the device comprises a flow diverter. The flow diverter need not necessarily be touched to the surface. The flow diverter may touch or may not touch the surface to be sucked.

In one embodiment, the flow diverter of the smooth zone of the device need not touch the surface to be sucked.

In one embodiment, the flow diverter of the smooth zone of the device touches the surface to be sucked.

In one embodiment, the vacuum chamber is uniquely designed to operate without any seal between the chamber and the surface.

In one embodiment, the acceleration zone when present; forms the outer perimeter of the suction device, which helps to increase the velocity of the incoming air or fluid or slurries and also may induce some turbulence into the air or fluid or slurries and finally feeds the high speed or fast-moving air or fluid or slurries to turbulence zone.

In one embodiment, the turbulence zone induce turbulence in the fast-moving air or fluid or slurries from the acceleration zone or from periphery of the device when acceleration zone is absent which causes a decrease in fluid energy which decreases the fluid pressure.

In one embodiment, the subdivided flow sections in particular the turbulence zone present at the interior surface of the base plate has multiple undulations and can be of geometrical design selected from:
 (a) semi-toroid followed by a back-step or axisymmetric undulations;
 (b) non-axisymmetric undulations comprising a number of protrusions;
 (c) non-axisymmetric undulations comprising wavy geometry;
 (d) bristle structures; and
 (e) flexible structures.

In one embodiment, the turbulence zone may vary in design or shape with multiple undulations or uneven notchy surface to induce turbulence which creates turbulence in a thin space located close to the perimeter of the device.

In one embodiment, the surface structure of the smooth zone has a special geometry that minimizes the change of the area of cross-section for the flowing air or fluid or slurries, thus provides constant cross-section area to be faced by the air or fluid or slurries.

In one embodiment, the ideal shape of the smooth zone is an axis-symmetric shape with design height of device from sucked surface is inversely proportional to the radial distance from the centre.

In one embodiment, the constant cross section condition throughout the flow path is fulfilled by the flow diverter present in the smooth zone.

In one embodiment, the device works by pulling the air or fluid or slurries into the vacuum chamber, accelerating the air or fluid or slurries, creating turbulence in the air or fluid or slurries in order to cause a drop in pressure, maintaining pressure over a large bottom area and finally exhausting the air or fluid or slurries through the fan(s) or rotating impeller(s).

In one embodiment, the basic overall geometrical structure of the suction device may be circular or polygonal or free-form shape.

In one embodiment, the device can be used as a suction apparatus or can be used in a suction apparatus which can work with fluids and slurries including gasses (e.g. air), liquids (e.g. water), or combination thereof, and gas or liquid having solids and particulates dispersed through.

In one embodiment, the sucking fan(s) or impeller(s) can be radial fan or axial fan or combinations of both, wherein the driveshaft of the fan(s) or impeller(s) can be powered directly or indirectly by connecting belts from the driving source, optionally the shaft provided with gears to allow rotation in reverse direction or to allow control fan(s) or impeller(s) speed.

In one embodiment, the power source can be AC or DC electric motors, gas or fuel combustion motors, steam power, compressed gas or air, flywheel or a mechanical winder device or other water, wind or magnetic arrangements.

In one embodiment, the invention provides a high flow low pressure suction device, wherein
 sucking fan(s) or rotating impeller(s) attached with a base plate, facing towards a vacuum chamber formed interior of the base plate sucks air or fluid or slurries from the environment through the perimeter of the device, where the interior geometrical design of the base plate by way of three subdivided flow sections comprises acceleration zone, turbulence zone and smooth zone;
 wherein the air or fluid or slurries from the perimeter of the device enters straight into the acceleration zone where the air or fluid or slurries is accelerated and then goes to the turbulence zone wherein the air or fluid or slurries experiences a sharp drop in pressure owning to the huge amount of energy loss due to turbulence created in zone and then after the air or fluid or slurries continues into the smooth zone wherein by the help of a flow diverter present at the center of the smooth zone which need not touch the sucked surface, diverts and controls flow and enables a constant cross section condition throughout the flow path faced by the air or fluid or slurries and wherein the smooth zone maintains the pressure over a large bottom area surface structure and finally the flow is sucked by the fan(s) and exhausted back into the surroundings (or the sump); thereby the device creates suction and sucks the surface;

wherein the suction device does not need to contact the sucked surface.

In another embodiment, the invention provides a high flow low pressure suction device, wherein sucking fan(s) or rotating impeller(s) attached with a base plate, facing towards a vacuum chamber formed interior of the base plate sucks air or fluid or slurries from the environment through the perimeter of the device, where the interior geometrical design of the base plate by way of two subdivided flow sections comprises turbulence zone and smooth zone;

wherein the air or fluid or slurries from the perimeter of the device enters directly into the turbulence zone which accelerates and creates turbulence to the air or fluid or slurries and experiences a sharp drop in pressure owning to the huge amount of energy loss due to turbulence created in zone and then after the air or fluid or slurries continues into the smooth zone wherein by the help of a flow diverter present at the center the smooth zone which need not touch the sucked surface, diverts and controls the flow and enables a constant cross section condition throughout the flow path faced by the air or fluid or slurries and wherein the smooth zone is designed so to keep the turbulence to a minimum and maintains the pressure over a large bottom area surface structure; and finally the flow is sucked by the fan(s) and exhausted back into the surroundings (or the sump); thereby the device creates suction and sucks the surface;

wherein the suction device does not need to contact the sucked surface.

In another embodiment, the invention provides a high flow low pressure suction device, wherein sucking fan(s) or rotating impeller(s) attached with a base plate, facing towards a vacuum chamber formed interior of the base plate sucks air or fluid or slurries from the environment through the perimeter of the device, where the interior geometrical design of the base plate by way of four subdivided flow sections comprises two acceleration zones, one turbulence zone and one smooth zone;

wherein the air or fluid or slurries from the perimeter of the device enters straight into the first acceleration zone where the air or fluid or slurries is accelerated and then goes to the turbulence zone wherein the air or fluid or slurries experiences a sharp drop in pressure owning to the huge amount of energy loss due to turbulence created in zone then again flows into a second acceleration zone and then after the air or fluid or slurries continues into the smooth zone, wherein by the help of a flow diverter present at the center of the smooth zone which need not touch the sucked surface, diverts and controls flow and enables a constant cross section condition throughout the flow path faced by the air or fluid or slurries and wherein the smooth zone maintains the pressure over a large bottom area surface structure and finally the flow is sucked by the fan(s) and exhausted back into the surroundings (or the sump); thereby the device creates suction and sucks the surface;

wherein the suction device does not need to contact the sucked surface.

In one embodiment the invention provides suction device as shown and illustrated by way of diagrams in FIGS. 1 to 26 of the present invention.

In one preferred embodiment, the suction device of the present invention is as shown and illustrated in FIGS. 1-3 of the invention.

In another preferred embodiment, the suction device of the present invention is as shown and illustrated in FIGS. 4-6 of the invention.

In another preferred embodiment, the suction device of the present invention is as shown and illustrated in FIGS. 7-9 of the invention.

In another preferred embodiment, the suction device of the present invention is as shown and illustrated in FIGS. 10-12 of the invention.

In another preferred embodiment, the suction device of the present invention is as shown and illustrated in FIGS. 13-15 of the invention.

Figure 17:
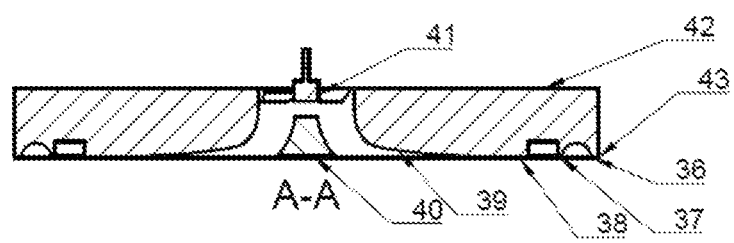
Figure 18:
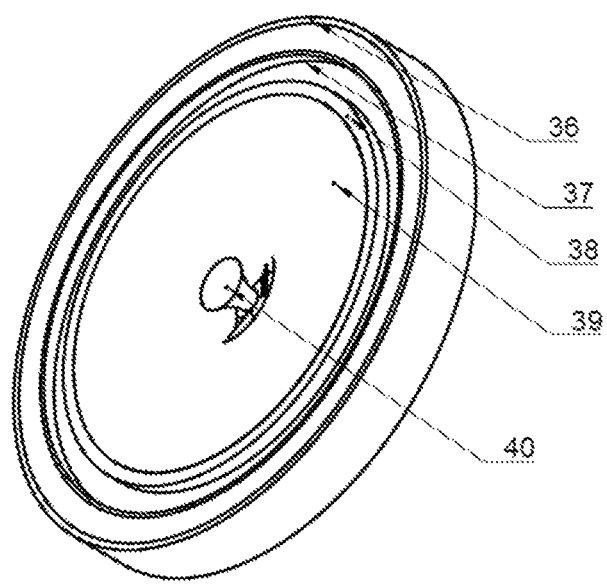

In another preferred embodiment, the suction device of the present invention is as shown and illustrated in FIGS. 16-18 of the invention.

In another preferred embodiment, the suction device of the present invention is as shown and illustrated in FIG. 19 of the invention.

BRIEF DESCRIPTION OF DRAWINGS AND FIGURES

FIG. 1: Shows the under-surface of the present invention.

FIG. 2: Shows the cut-section view of the apparatus along A-A in FIG. 1.

FIG. 3: Shows the isometric view of the invention.

FIG. 4, FIG. 5 and FIG. 6: Show the under-surface, cut-section view and the isometric view of an alternate embodiment class, one that has the same overall structure but the turbulence zone geometry is different. In this particular case the turbulence zone geometry is an axisymmetric undulation.

FIG. 7, FIG. 8 and FIG. 9: Show the under-surface, cut-section view and the isometric view of an alternate embodiment class, one that has the same overall structure but the turbulence zone geometry is different. In this particular case the turbulence zone geometry is a non-axisymmetric system of undulations. The structure can be made out of stiff material as well as bristle like structures. The turbulence zone geometry can be completely non-symmetric also.

FIG. 10, FIG. 11 and FIG. 12: Show the under-surface, cut-section view and the isometric view of an alternate embodiment class, one that has the same organization of the zones but the overall structure is polygonal rather than circular. This class of devices may have other polygons or any free-form shapes as their basic structure.

FIG. 13, FIG. 14 and FIG. 15: Show the under-surface, cut-section view and the isometric view of an alternate embodiment class, one that does not have a physical acceleration zone in the apparatus. However as can be seen in FIG. 19 and FIG. 20 the acceleration zone extends beyond the actual physical device/apparatus. Hence, even though this alternate embodiment does not seem to have an acceleration zone, it actually has one which exists only beyond the device/apparatus domain.

FIG. 16, FIG. 17 and FIG. 18: Show the under-surface, cut-section view and the isometric view of an alternate embodiment class respectively, one that has two acceleration zones, one before the turbulence zone and one after the turbulence zone.

FIG. 19: Shows the flow pattern and direction in a typical scenario of the present invention. The direction is important as unlike a pure Bernoulli's principal based non-contact suction system, the present invention produces suction in only inward air-flow direction.

FIG. 20: Shows the approximate pressure distribution under the present invention device/system and can be compared against FIG. 19 to understand the pressure drop in each zone.

FIG. 21 and FIG. 22: Show a possible attachment method for the flow diverter. In all previous drawings the flow diverter appears to be floating as the attachment is not shown for clarity purpose.

FIG. 23 and FIG. 24: Show a possible attachment method for attaching the present invention to a manipulator.

FIG. 25 and FIG. 26: Show a possible way to use the present invention in a mobile robot capable of moving on slant, vertical or upside-down surfaces.

DETAILED DESCRIPTION OF THE INVENTION

The present invention relates to high flow low pressure suction device. Particularly, the invention belongs to the field of fluid mechanics which describes a suction mechanism and/or device involving multiple stage turbulence based high flow low pressure suction that does not need to contact the sucked surface. The suction device of the present invention produces non-contact suction in a new and more efficient manner. The word non-contact does not claim that no portion of the suction mechanism can touch the surface. It only means that a proper seal with the surface is not required.

The device can be used to suck, suspend, hold, lift and interrupt an object. The device can also be used to adhere to a surface as needed in wall climbers. The device can be used alone or in conjugation with other mechanical or electronic systems. The device can work with any fluids and slurries including gasses (e.g. air), liquids (e.g. water), or any combination thereof, slurries, or any other gas and/or liquid having solids and/or particulates dispersed through.

In one aspect the present invention provides non-contact multiple stage (two and/or three stages and/or more than three stages such as four stages) turbulence based suction mechanism and device. The device is based on a new concept, wherein the device uses the concept of turbulence to create a pressure drop at the perimeter of an arrangement made for the suction device whereas in the interior of the device the geometry ensures negligible change in flow speed and hence reduce flow energy losses. This configuration generates a more uniform pressure profile that in turn increases efficiency.

The above mechanism in the device is executed by fan(s) or rotating impeller(s) for drawing air/fluid/slurries and a vacuum chamber, wherein the vacuum chamber is uniquely designed to operate without any seal between the chamber and the surface. The device uses a novel method of utilizing turbulence to produce low pressure. The arrangements made for the device compounds this turbulence based low pressure generation along with Bernoulli's principle to yield a high efficiency suction device. The device implements the above concept by making the air/fluid/slurries flow through two zones namely the turbulence zone(s) (high turbulence zone) and smooth zone(s) (minimum turbulence zone). The device can also involve three physical zones by additionally comprising acceleration zone. Acceleration zone(s) can be present at the perimeter of the device or after turbulence zone or both. Air/fluid/slurries flow through the acceleration zone and then pass to the turbulence zone (high turbulence zone). Additionally, the acceleration zone may also be present just after the turbulence zone to reduce incoming turbulence to the smooth zone. In one variant of the invention the device may comprise two acceleration zones along with turbulence zone and smooth zone as illustrated in respective drawings FIGS. 16-18.

The device works by pulling the air/fluid/slurries into the vacuum chamber, accelerating the air/fluid/slurries, creating turbulence in the air/fluid/slurries in order to cause a drop in pressure, maintaining pressure over a large bottom area and finally exhausting the air/fluid/slurries through the fan(s)/rotating impeller(s).

In one preferred embodiment the device comprises two zones namely the turbulence zone(s) (high turbulence zone) and smooth zone(s) (minimum turbulence zone).

In one preferred embodiment the device comprises three zones namely the acceleration zone(s), the turbulence zone(s) (high turbulence zone) and smooth zone(s) (minimum turbulence zone).

In one preferred embodiment the device comprises four zones namely two acceleration zones, one turbulence zone (high turbulence zone) and one smooth zone (minimum turbulence zone).

In another aspect the present invention provides an apparatus comprising above mentioned suction device or non-contact two/three/more than three stage turbulence based suction device of the present invention.

Person skilled in the art, by following the turbulence based concept of present invention can modify the number of zones and can produce a suction device comprising more than two or three or four zones as described in the present invention. Further skilled person, by following the turbulence based concept of present invention can design a suction device comprising repetition of one or more of different zones or repetition of arrangement of two or three or four zones in a device. One such example is a device comprising repetition of first two zones i.e. acceleration zone followed by turbulence zone followed by acceleration zone followed by turbulence zone; along with smooth zone as the innermost zone. Similar other variations are also possible. All such devices with variations in designing based on the concept of turbulence are within the scope of the present invention.

The Device:

The device of the present invention is based on the novel concept/mechanism as described above implementing the concept of turbulence involving multiple stage physical zones such as

- by involving two zones namely the turbulence zone(s) (high turbulence zone) and smooth zone(s) (minimum turbulence zone); or
- by involving three zones namely the acceleration zone(s), the turbulence zone(s) (high turbulence zone) and smooth zone(s) (minimum turbulence zone); or
- by involving more than three zones such as two acceleration zones, turbulence zone(s) (high turbulence zone) and smooth zone(s) (minimum turbulence zone).

The suction device possesses interior or underbody portion and outer/outer body portion.

The suction device comprises:
  a base plate wherein the interior surface of the base plate comprises subdivided flow sections physically created therein (physical zones);
  vacuum chamber, comprising the total region between the base plate and the sucked surface.
  sucking fan(s)/rotating impeller(s) attached with the base plate facing towards the vacuum chamber and drawing air out of the vacuum chamber.
  The device further comprises flow diverter(s) at the center to divert the flow of air/fluid/slurries in the flow path. The flow diverter is a part of the smooth zone and the diverter is present in the smooth zone region. This diverter also maintains constant cross section condition throughout the flow path in the device. The flow diverter need not necessarily be touched to the surface. The flow diverter may touch the surface to be sucked or may not touch the surface to be sucked.

In one preferred embodiment of the present invention, the flow diverter does not touch the surface to be sucked. However, the suction device of the present invention based on turbulence concept can also be designed with flow diverter that touches the surface. Thus in another preferred embodiment, the flow diverter of the smooth zone of the device touches the surface to be sucked.

The underbody or interior of the device is the only important section. There is no design restrictions apply on the top/outer surfaces of the device. The overall outer shape or design of the device may vary and can be of any shape.

In the underbody/interior portion, the device of the present invention comprises various subdivided flow sections on the base plate based on the impact of the section on the air/fluid/slurries flow. The sections in the base plate are viz. the acceleration zone, the turbulence zone and the smooth zone.

The first section is the acceleration zone, which is typically at the outer perimeter of the present suction mechanism/device but may also be added after the turbulence zone or both one at outer perimeter and one after turbulence zone. This zone basically helps increase the velocity of the incoming air/fluid/slurries. This section may also induce some turbulence into the air/fluid/slurries. The acceleration zone is typically small (0.1 mm to a few millimeters) but can also be kept large. The acceleration zone may also be present just after the turbulence zone to reduce turbulence entering into the smooth zone.

The second section is the turbulence zone that has multiple undulations and an uneven notchy surface to induce turbulence in the fast-moving air/fluid/slurries from the acceleration zone. This causes a decrease in air/fluid/slurries energy which decreases the air/fluid/slurries pressure. The turbulence zone is designed to maximize turbulence and boundary layer separation (this zone is desired to be as thin as possible but to obtain sufficient energy loss the zone usually spans to around 10-15% of the radius in thickness). The operating method of this zone can be viewed as an aerodynamic seal. This zone visually distinguishes the present invention from the prior art.

The third zone is the smooth zone focused towards minimizing the air/fluid/slurries energy losses. This final section leads to the impeller that finally exhausts the air/fluid/slurries into the sump (or environment). The smooth zone is designed to minimize the energy loss in air/fluid/slurries. This system creates a nearly uniform low pressure under the bottom surface that is spread over the entire smooth zone (nearly complete surface). For this reason, the smooth zone must be very large and has a minimum of 45% of the net projected area. Even though the pressure magnitude is small the large area underneath creates very large forces. The flow diverter is a part of the smooth zone.

The smooth zone has a special geometry that minimizes the change of the area of cross-section for the flowing air/fluid/slurries. The ideal shape for this is an axis-symmetric shape with design height of apparatus from sucked surface is inversely proportional to the radial distance from the center. However, to maintain negligible change in area over the whole flow one needs to add a flow diverter that acts as the second surface in place of the sucked surface in the region before the impeller. The smooth zone can have a maximum of 40% change in flow velocity over the whole smooth zone to be considered as smooth zone.

Thus in one embodiment, the device of the present invention comprises:
  a base plate wherein the interior surface of the base plate comprises three subdivided flow sections namely the acceleration zone, the turbulence zone (high turbulence) and the smooth zone (minimum turbulence) all physically created therein; and
  sucking fan(s)/rotating impeller(s) attached with the base plate facing towards the vacuum chamber and sucking air out of the chamber; and
  a flow diverter, at the center to divert the flow of air/fluid/slurries in the flow path.

In another embodiment, the device of the present invention comprises:
  a base plate wherein the interior surface of the base plate comprises two subdivided flow sections namely the turbulence zone (high turbulence) and the smooth zone (minimum turbulence) both physically created therein.
  sucking fan(s)/rotating impeller(s) attached with the base plate facing towards the vacuum chamber and sucking air out of the chamber; and
  a flow diverter, at the center to divert the flow of air/fluid/slurries in the flow path.

However the acceleration zone extends beyond the actual physical device/apparatus. Hence, even though this alternate embodiment (two zones) which does not seem to have an acceleration zone, it actually has one which exists only beyond the device/apparatus domain (see FIG. 13-15 and FIG. 19-20). In one preferred embodiment, the device of the present invention comprises three subdivided flow sections. In another preferred embodiment, the device of the present invention comprises two subdivided flow sections.

In another embodiment, the device of the present invention comprises:
  a base plate wherein the interior surface of the base plate comprises four subdivided flow sections namely two acceleration zones, the turbulence zone (high turbulence) and the smooth zone (minimum turbulence) all four zones physically created therein; and
  sucking fan(s)/rotating impeller(s) attached with the base plate facing towards the vacuum chamber and sucking air out of the chamber; and
  a flow diverter, at the center to divert the flow of air/fluid/slurries in the flow path.

The two acceleration zones may be arranged in a way that the turbulence zone is present in between the two acceleration zones i.e. first a acceleration zone, then a turbulence zone and then again a acceleration zone.

In the above device(s):
  the sucking fan sucks air/fluid/slurries into the system of the device and the base plate, where the interior geometrical design by way of subdivided flow sections of the base plate controls flow speed of air/fluid/slurries;

the device works by pulling the air/fluid/slurries into the vacuum chamber, accelerating the air/fluid/slurries, creating turbulence in the air/fluid/slurries in order to cause a drop in pressure, maintaining pressure over a large bottom area and finally exhausting the air/fluid/slurries through the fan/rotating impeller.

the suction device does not need to contact the sucked surface.

The sucking fan(s)/impeller(s) can be radial fan(s) or axial fan(s) or both. In one embodiment radial fan(s) is/are used. In one embodiment axial fan(s) is/are used. In one embodiment combination of radial fan(s) and axial fan(s) can be used. The function of the fan(s) is to suck air/fluid/slurries. The number of fan/impeller may vary as per need to sufficiently enable sucking action of the device. The device of the present invention may employ one fan or more than one fan such as two or three or four or like. An artisan in the field can choose the type of fan/impeller and can modify the number of fan/impeller as per need. The driveshaft for the impeller may be powered by any conceivable means, such as AC or DC electric motors, gas or fuel combustion motors, steam power, compressed gas or air, flywheel or a mechanical winder device. The driveshaft may be of any length or shape, and it may be flexible. Power may be provided directly from the motor to the driveshaft, or by one or more drive belts or chains connecting the driveshaft to the motor. Optional gears may be provided which allow the driveshaft to reverse the direction of rotation or allow for the speed of the impeller to be controlled at a constant motor speed. Alternative drive mechanisms may also be used, such as water, wind or magnetic arrangements. Furthermore, the power source may also provide energy to additional devices.

The present suction device/apparatus may be made from any material including soft rubber like materials. Certain sections of the apparatus that are in closer proximity to the sucked surface than other sections may be made of flexible materials to improve the maximum obstacle height that can be traversed. The device/apparatus may be designed with a variety of turbulence zone profiles ranging from simple axis-symmetric back-step profiles to very complex asymmetric profiles but the end goal of producing turbulence in a thin space located close to the perimeter of the device/apparatus will stay the same.

The underbody of the invention is the only important section and no design restrictions apply on the top surfaces.

The overall advantages of the device over prior art can be summarized as high energy efficiency in comparison to other non-contact suction methods, low pressure operation that minimizes the load on the sucked surface and spreads the load over larger distances.

Another major advantage over all devices is the high robustness in this device. In a contact based suction system a slight roughness can decrease suction drastically hence causing catastrophic failure. However non-contact suction mechanisms like Bernoulli pads are more robust, they are also affected intensely if a surface protrusion comes in contact with the inner sections of the suction plate. The present invention however has its inner sections of the device/apparatus higher from the sucked surface in comparison to the rest of the body by the virtue of the novel suction strategy, hence improving the robustness of the device/apparatus.

Other advantages over suction cup based designs include lower cost due to less complex geometry as compared to segmented rubber seals, higher durability due to absence of contact and abrasion between the apparatus and the sucked surface.

Working Principle

The suction device and/or apparatus of the present invention is based on a non-contact multiple stage turbulence based suction mechanism, which implements the three stage or two stage or multiple stage such as four stage turbulence concept by making the fluid flow through three zones or two zones or multiple zones such as four zones respectively, the zones selected from namely the acceleration zone(s), turbulence zone(s) (high turbulence zone) and smooth zone(s) (minimum turbulence zone). If the device is based on two zones, then the device must comprise two zones viz. turbulence zone(s) and smooth zone(s).

The device/apparatus comprises fan(s) or rotating impeller(s) for drawing air/fluid/slurries and a vacuum chamber. The vacuum chamber is uniquely designed to operate without any seal between the chamber and the surface. The concept uses turbulence to create a pressure drop at the perimeter of the device whereas in the interior of the device the geometry ensures negligible change in flow speed and hence reduce flow energy losses. This configuration generates a more uniform pressure profile that in turn increases efficiency. The device compounds this turbulence based low pressure generation along with Bernoulli's principle to yield a high efficiency suction device.

The device works by pulling the air/fluid/slurries into the vacuum chamber, accelerating the air/fluid/slurries, creating turbulence in the air/fluid/slurries in order to cause a drop in pressure, maintaining pressure over a large bottom area and finally exhausting the air/fluid/slurries through the fan(s)/rotating impeller(s).

The assembly and working of a high flow low pressure suction device comprising three stage sub-divided zones is as follows:

a sucking fan/rotating impeller (48) attached with a base plate (49), facing towards a vacuum chamber formed interior of the base plate sucks air/fluid/slurries (51) from the environment through the perimeter (50) of the device, where the interior geometrical design of the base plate (49) by way of three subdivided flow sections comprises acceleration zone (44), turbulence zone (45) and smooth zone (46);

wherein the air/fluid/slurries from the perimeter (50) enters straight into the acceleration zone (44) where the air/fluid/slurries is accelerated and then goes to the turbulence zone (45) wherein the air/fluid/slurries experiences a sharp drop in pressure owning to the huge amount of energy loss due to turbulence created in zone (45) and then after the air/fluid/slurries continues into the smooth zone (46) wherein by the help of a flow diverter (47) present at the center which need not touch the sucked surface (52), diverts and controls flow and enables a constant cross section condition throughout the flow path faced by the air/fluid/slurries and wherein the zone (46) maintains the pressure over a large bottom area surface structure and finally the flow is sucked by the fan (48) and exhausted back into the surroundings (or the sump); thereby the device creates suction and sucks the surface;

wherein the suction device does not need to contact the sucked surface.

The assembly and working of a high flow low pressure suction device comprising two stage sub-divided zones is as follows:

a sucking fan/rotating impeller (32) attached with a base plate (34), facing towards a vacuum chamber formed interior of the base plate sucks air/fluid/slurries from the environment through the perimeter (35) of the device, where the interior geometrical design of the base plate (34) by way of two subdivided flow sections comprises turbulence zone (29) and smooth zone (30);

wherein the air/fluid/slurries from the perimeter (35) enters directly into the turbulence zone (29) which accelerates and creates turbulence to the air/fluid/slurries and experiences a sharp drop in pressure owning to the huge amount of energy loss due to turbulence created in zone (29) and then after the air/fluid/slurries continues into the smooth zone (30) wherein by the help of a flow diverter (31) present at the center which need not touch the sucked surface, diverts and controls the flow and enables a constant cross section condition throughout the flow path faced by the air/fluid/slurries and wherein the zone (30) is designed so to keep the turbulence to a minimum and maintains the pressure over a large bottom area surface structure; and finally the flow is sucked by the fan (32) and exhausted back into the surroundings (or the sump); thereby the device creates suction and sucks the surface;

wherein the suction device does not need to contact the sucked surface.

The assembly and working of a high flow low pressure suction device comprising four stage sub-divided zones is as follows:

a sucking fan/rotating impeller (41) attached with a base plate (42), facing towards a vacuum chamber formed interior of the base plate sucks air/fluid/slurries from the environment through the perimeter (43) of the device, where the interior geometrical design of the base plate (42) by way of four subdivided flow sections comprises two acceleration zones (36, 38), turbulence zone (37) and smooth zone (39);

wherein the air/fluid/slurries from the perimeter (43) enters straight into the first acceleration zone (36) where the air/fluid/slurries is accelerated and then goes to the turbulence zone (37) wherein the air/fluid/slurries experiences a sharp drop in pressure owning to the huge amount of energy loss due to turbulence created in zone (37), then again flows into a second acceleration zone (38) and then after the air/fluid/slurries continues into the smooth zone (39) wherein by the help of a flow diverter (40) present at the center which need not touch the sucked surface, diverts and controls flow and enables a constant cross section condition throughout the flow path faced by the air/fluid/slurries and wherein the zone (39) maintains the pressure over a large bottom area surface structure and finally the flow is sucked by the fan (41) and exhausted back into the surroundings (or the sump); thereby the device creates suction and sucks the surface;

wherein the suction device does not need to contact the sucked surface.

The reference numerals as mentioned above are for better understanding of the different embodiments of the device of the present invention with reference to figures illustrated in drawings. The numerals are illustrative, not limiting the scope of the present invention.

The device of the present invention and working of the device described above is further explained and presented by way of figures and representations as shown in drawings and below different embodiments. The present invention is not limited to the overall design/shape of the suction device/apparatus as presented in figures, and the design/shape can be free-form also.

Person skilled in the art, by following the turbulence based concept of present invention can modify the number of zones and can produce a suction device comprising more than two or three or four zones as described in the present invention. Further skilled person, by following the turbulence based concept of present invention can design a suction device comprising repetition of one or more of different zones or repetition of arrangement of two or three or four zones in a device. The flow diverter need not necessarily be touched to the surface. The flow diverter in the smooth zone may touch or may not touch the surface to be sucked. In one preferred embodiment of the present invention as described above, the flow diverter does not touch the surface to be sucked. However, the suction device of the present invention based on turbulence concept can also be designed with flow diverter that touches the surface. All such devices with variations in designing such as number of zones or repetition of zone(s) and/or flow diverter which touches the surface based on the concept of turbulence are within the scope of the present invention.

The device of the invention can be understood from the drawings as presented in FIG. 1 to FIG. 26; wherein FIGS. 1 to 18 represents various embodiments (six) of the invention wherein the device (as shown in FIGS. 1 to 19) comprises (respectively in each embodiments/figure) a base plate (6=13=20=27=34=42=49) comprising two/three/four subdivided flow sections as physical zones selected from acceleration zone (1=8=15=23=36=38=44), turbulence zone (2=9=16=24=29=37=45) and smooth zone (3=10=17=25=30=39=46); sucking fan (5=12=19=33=32=41=48); and flow diverter (4=11=18=26=31=40=47). In all the above embodiments (except 5$^{th}$ embodiment, where acceleration zone is not physically present and comprises only two zones (29) and (30)), in all others the base plate (6=13=20=27=42=49) comprises three/four zones selected from three physical zones viz. acceleration zone (1, 8, 15, 23, 36, 38, 44), turbulence zone (2,9, 16, 24, 37, 45) and smooth zone (3, 10, 17, 25, 39, 46), wherein the figures vary by way of geometry and/or shape of different flow sections (zones) and/or overall shape of the suction device, which can be seen in respective embodiments and figures; which are further explained below. The sixth embodiment comprises three zones along with an additional acceleration zone.

The preferred embodiment (1$^{st}$) of the invention is shown in FIG. 1, FIG. 2 and FIG. 3, which show the under-surface, the cut-section view and the isometric view respectively of the present invention. The suction device as shown in FIG. 1-3 comprises a base plate (6) comprising three subdivided flow sections as physical zones (1), (2) and (3); sucking fan(s) (5); and a flow diverter (4). The fluid from the environment enters the device from the perimeter (7) which basically is the edge of the system, and goes straight into the acceleration zone (1). This zone is a thin edge in the preferred embodiment. The air then goes to the turbulence zone (2). The preferred embodiment has a section of a semi toroid or half toroid followed by a back-step as the turbulence zone. The air experiences a sharp drop in pressure in this region owning to the huge amount of energy loss due to turbulence. The air continues into the smooth zone (3) where the surface structure is such that the cross-section area faced by the fluid remains almost constant. To fulfill this constant cross section condition throughout the flow path, a flow diverting device (4) is used in the center. The flow diverter (4) need not touch the sucked surface. The flow finally is sucked by the fan(s) (5) and exhausted into the surroundings (or the sump). The FIG. 19 and FIG. 20 show the flow of fluid and the corresponding pressure drop in the preferred embodiment.

The alternate embodiment ($2^{nd}$) as shown in FIG. 4, FIG. 5 and FIG. 6 which show the under-surface, cut-section view and the isometric view respectively of the present invention; which are different from FIG. 1-3 in the sense that the turbulence zone has a different geometry i.e. one that has the same overall structure as in case of FIG. 1-3 but the turbulence zone geometry is an axisymmetric undulation.

The turbulence zone geometry can be any wavy geometry that need not even be axis-symmetric as shown in FIG. 7, FIG. 8, FIG. 9, FIG. 10, FIG. 12 and FIG. 13. Therefore, in FIG. 4, FIG. 5 and FIG. 6, the flow enters from the perimeter (14) and goes through the acceleration zone (8) and into the turbulence zone (9). After this the air enters the smooth zone (10) which finally leads to the fan(s)/impeller(s) (12). The device comprises flow diverter (11) for control of fluid flow.

The alternate embodiment ($3^{rd}$) shown in FIG. 7, FIG. 8 and FIG. 9 show the under-surface, cut-section view and the isometric view respectively of the present invention, wherein the turbulence zone is non-axisymmetric. The fluid enters the device from the perimeter (21) and goes to the acceleration zone (15). Then the air enters the turbulence zone (16) that comprises of a number of protrusions (22) that induce turbulence in the flow. In FIG. 9 portion of turbulence zone (16) is enlarged and shown in portion B, which shows the protrusions (22). The flow then enters the smooth zone (17) which extends up-to the fan(s) or impeller(s). The smooth zone is designed to keep the turbulence to a minimum. This is done by keeping the area for the flow as nearly constant so the average speed of the fluid stays nearly constant throughout the zone. This condition is achieved using the flow diverter (18). The flow finally enters the impeller(s) or the fan(s) (19) that exhausts the air back into the environment.

The alternate embodiment ($4^{th}$) shown in FIG. 10, FIG. 11 and FIG. 12 which show the under-surface, cut-section view and the isometric view respectively of the present invention wherein the device comprises non-axisymmetric zones. The basic geometry of the apparatus has been changed to a polygonal geometry. The geometry in this representation is like a square. The basic geometry could be any free form shape. The fluid enters the device from the perimeter (28) and goes to the acceleration zone (23). The acceleration zone is of a non-uniform thickness. Then the air enters the turbulence zone that comprises of a number of protrusions that induce turbulence in the flow. This zone is demarcated by (24). The flow then enters the smooth zone (25) which extends up-to the fan(s) or impeller(s) (33). The smooth zone is designed to keep the turbulence to a minimum. This is done by keeping the area for the flow as nearly constant so the average speed of the fluid stays nearly constant throughout the zone. This condition is achieved using the flow diverter (26). The flow finally enters the impeller(s) or the fan(s) (33) that exhausts the air back into the environment.

The alternate embodiment ($5^{th}$) shown in FIG. 13, FIG. 14 and FIG. 15 which show the under-surface, cut-section view and the isometric view respectively of the present invention shows a device without a physical acceleration zone. The fluid enters the device from the perimeter (35) which is basically the outer edge and goes directly to the turbulence zone (29). However, the FIG. 19 and FIG. 20 can be used to understand that the air does accelerate before entering the device. The absence of an acceleration zone is highlighted in the enlarged view B. The turbulence zone comprises of a number of protrusions that induce turbulence in the flow. The flow then enters the smooth zone (30) which extends up-to the fan or impeller. The smooth zone is designed to keep the turbulence to a minimum. This is done by keeping the area for the flow as nearly constant so the average speed of the fluid stays nearly constant throughout the zone. This condition is achieved using the flow diverter (31). The flow finally enters the impeller(s) or the fan(s) (32) that exhausts the air back into the environment.

The alternate embodiment (6th) shown in FIG. 16, FIG. 17 and FIG. 18 which show the under-surface, cut-section view and the isometric view respectively of the present invention shows a device with two physical acceleration zones. The fluid enters the device from the perimeter (43) which is basically the outer edge and goes to the acceleration zone (36). The accelerated high speed air goes to the turbulence zone (37). The turbulence zone comprises of a number of protrusions that induce turbulence in the flow. The flow then enters the second acceleration zone (38) that accelerates the air. This reduces the amount of turbulence and provides better air quality to the smooth zone. However, this zone needs to be very thin. The flow then enters the smooth zone (39) which extends up-to the fan(s) or impeller(s) (41). The smooth zone is designed to keep the turbulence to a minimum. This is done by keeping the area for the flow as nearly constant so the average speed of the fluid stays nearly constant throughout the zone. This condition is achieved using the flow diverter (40). The flow finally enters the impeller(s) or the fan(s) (41) that exhausts the air back into the environment.

The FIG. 19 shows the flow direction and type in the preferred embodiment. The flow (51) is shown entering the perimeter (50). The perimeter refers to the outer edge of the base plate (49). The flow then enters the acceleration zone (44) which is physically a surface with its normal vector along the axis (53). The axis (53) is the axis of symmetry. The flow then enters the turbulence zone (45) that induces turbulence due to the undulations and sharp edges present. The flow finally enters the smooth zone (46) that has minimal change in flow velocity to maintain flow energy. The smooth zone has a flow diverter to help meet the minimal velocity change criteria throughout the flow path. As can be seen from the figure, no part of the apparatus touches the sucked surface (52).

In the above figures, the attachment of the flow diverter (4=11=18=26=31=40=47) to the base plate (6=13=20=27=34=42=49) is shown in FIG. 21 and FIG. 22, wherein (58) represents flow diverter.

The FIG. 20 shows the pressure distribution under the suction device. The acceleration zone (54), the turbulence zone (55), the smooth zone (56) and the axis of symmetry (57) has been depicted. It can be seen that the pressure drops below atmospheric pressure even before the fluid enters the acceleration zone. This is because the air has certain velocity when it enters the device/apparatus but in a calm stagnant and ideal atmosphere the air is stagnant. As such the kinetic energy at entry comes at the expense of pressure energy correctly predicted by the Bernoulli's equation. The drop-in pressure is then enhanced in the acceleration zone (54) and the turbulence zone (55). The pressure is then maintained in the smooth zone (56) using a constant velocity funnel shape. The constant velocity funnel works perfectly at design height but the operation is compromised at other heights. As such it can be considered a smooth zone only if the velocity changes over the smooth zone is less than 40%.

FIG. 21 and FIG. 22 show a possible attachment of the flow diverter (58) to the base plate. In all previous figures these attachments are not shown for clarity purpose and a floating flow diverter is shown. The flow diverter has thin radial fins (59) that attach to the base plate. The edge at attachment point (60) has been shown in magnified view A.

FIGS. 23 to 26 represent two representative uses of the suction device of the present invention and illustrate attachment of the device to support system. However, these uses do not limit the scope of the present invention. The suction device of the present invention can be used in many ways for suction and can be attached with support system(s) as per need and type of use.

FIG. 23 and FIG. 24 show a possible method of attachment of the present invention (61) to the arm of a manipulator. The drive system (63) for the fan/impeller (64) may attach to the suction device (61) and a movable joint (65) connects the suction device (61) with the manipulator (62).

FIG. 25 and FIG. 26 show another possible use case of the present invention. The present invention can be used in a mobile robot that can move on slant, vertical or upside-down surfaces. The upper surface of the base plate (69) can be modified to be used as the main body for the mobile robot. This is possible because there are no restrictions on the upper surface of the robot. The drive mechanism (68) for the wheels/tracks can be mounted directly on the modified top surface of the base plate (69). The wheels/tracks (67) get attached to the drive mechanism empowering the robot to translate on the sucked surface (66). The drive mechanism (70) for the fan/impeller (71) can also be mounted directly on the modified top surface of the base plate (69). The electronics and other equipment/payload (72) can also be directly mounted on the modified top surface of the suction device. The flow diverter can be attached to the base plate using a radial fin (73) structure. The robot uses a combination of suction force and wheel/track friction generated due to suction force to stay and move on the vertical, slant or upside-down surfaces.

I claim:

1. A high flow low pressure suction device comprising:
    a base plate, wherein the interior surface of the base plate comprises subdivided flow sections physically created therein (physical zones);
    sucking fan(s) or rotating impeller(s) attached with the base plate facing towards vacuum chamber;
    wherein the sucking fan(s) sucks air or fluid or slurries into the device and into the base plate from the periphery of the base plate, where the interior geometrical design by way of subdivided flow sections of the base plate controls flow speed of air or fluid or slurries; and
    wherein the suction device does not need to contact the sucked surface.

2. The suction device as claimed in claim 1, wherein the base plate comprises multiple subdivided flow sections selected from acceleration zone, turbulence zone and smooth zone.

3. The suction device as claimed in claim 2, wherein the multiple subdivided flow sections present at the interior surface of the base plate comprises one turbulence zone and one smooth zone.

4. The suction device as claimed in claim 2, wherein the multiple subdivided flow sections present at the interior surface of the base plate comprises one acceleration zone, one turbulence zone and one smooth zone.

5. The suction device as claimed in claim 2, wherein the multiple subdivided flow sections present at the interior surface of the base plate comprises two acceleration zones, one turbulence zone and one smooth zone.

6. The suction device as claimed in claim 2, wherein the smooth zone of the device comprises a flow diverter.

7. The suction device as claimed in claim 6, wherein the flow diverter need not touch the surface to be sucked.

8. The suction device as claimed in claim 1, wherein the vacuum chamber is uniquely designed to operate without any seal between the chamber and the surface.

9. The suction device as claimed in claim 2, wherein the acceleration zone when present, forms the outer perimeter of the suction device, which helps to increase the velocity of the incoming air or fluid or slurries and also may induce some turbulence into the air or fluid or slurries and finally feeds the high speed or fast-moving air or fluid or slurries to turbulence zone.

10. The suction device as claimed in claim 2, wherein the turbulence zone induce turbulence in the fast-moving air or fluid or slurries from the acceleration zone or from periphery of the device when acceleration zone is absent which causes a decrease in fluid energy which decreases the fluid pressure and maximise turbulence and boundary layer separation.

11. The suction device as claimed in claim 2, wherein the subdivided flow sections in particular the turbulence zone present at the interior surface of the base plate has multiple undulations and can be of geometrical design selected from:
    (f) semi-toroid followed by a back-step or axisymmetric undulations;
    (g) non-axisymmetric undulations comprising a number of protrusions;
    (h) non-axisymmetric undulations comprising wavy geometry;
    (i) bristle structures; and
    (j) flexible structures.

12. The suction device as claimed in claim 11, wherein the turbulence zone may vary in design or shape with multiple undulations or uneven notchy surface to induce turbulence which creates turbulence in a thin space located close to the perimeter of the device.

13. The suction device as claimed in claim 2, wherein the surface structure of the smooth zone has a special geometry that minimizes the change of the area of cross-section for the flowing air or fluid or slurries at design height wherein change in height will compromise this condition but velocity changes should remain less than 40%.

14. The suction device as claimed in claim 13, wherein the ideal shape of the smooth zone is an axis-symmetric shape with design height of device from sucked surface is inversely proportional to the radial distance from the centre for a given finite design height.

15. The suction device as claimed in claim 13, wherein the constant cross section condition throughout the flow path at design height is fulfilled by the flow diverter present in the smooth zone.

16. The suction device as claimed in claim 1, wherein the device works by pulling the air or fluid or slurries into the vacuum chamber, accelerating the air or fluid or slurries, creating turbulence in the air or fluid or slurries in order to cause a drop in pressure, maintaining pressure over a large bottom area and finally exhausting the air or fluid or slurries through the fan(s) or rotating impeller(s).

17. The suction device as claimed in claim 1, wherein the basic overall geometrical structure of the suction device may be circular or polygonal or free-form shape.

18. The suction device as claimed in claim 1, wherein the device can be used as a suction apparatus or can be used in a suction apparatus which can work with fluids and slurries including gasses (e.g. air), liquids (e.g. water), or combination thereof, and gas or liquid having solids and particulates dispersed through.

19. The device or apparatus as claimed in claim 1, wherein the sucking fan(s) or impeller(s) can be radial fan or axial fan or combinations of both, wherein the driveshaft of the fan(s) or impeller(s) can be powered directly or indirectly by connecting belts from the driving source, optionally the shaft provided with gears to allow rotation in reverse direction or to allow control fan(s) or impeller(s) speed.

20. The device or apparatus as claimed in claim 18, wherein the sucking fan(s) or impeller(s) can be radial fan or axial fan or combinations of both, wherein the driveshaft of the fan(s) or impeller(s) can be powered directly or indirectly by connecting belts from the driving source, optionally the shaft provided with gears to allow rotation in reverse direction or to allow control fan(s) or impeller(s) speed.

21. The device or apparatus as claimed in claim 19, wherein the power source can be AC or DC electric motors, gas or fuel combustion motors, steam power, compressed gas or air, flywheel or a mechanical winder device or other water, wind or magnetic arrangements.

22. The device or apparatus as claimed in claim 20, wherein the power source can be AC or DC electric motors, gas or fuel combustion motors, steam power, compressed gas or air, flywheel or a mechanical winder device or other water, wind or magnetic arrangements.

23. A high flow low pressure suction device, wherein
sucking fan(s) or rotating impeller(s) attached with a base plate, facing towards a vacuum chamber formed interior of the base plate sucks air or fluid or slurries from the environment through the perimeter of the device, where the interior geometrical design of the base plate by way of three subdivided flow sections comprises acceleration zone, turbulence zone and smooth zone;
wherein the air or fluid or slurries from the perimeter of the device enters straight into the acceleration zone where the air or fluid or slurries is accelerated and then goes to the turbulence zone wherein the air or fluid or slurries experiences a sharp drop in pressure owning to the huge amount of energy loss due to turbulence created in zone and then after the air or fluid or slurries continues into the smooth zone wherein by the help of a flow diverter present at the center of the smooth zone which need not touch the sucked surface, diverts and controls flow and enables a constant cross section condition throughout the flow path faced by the air or fluid or slurries and wherein the smooth zone maintains the pressure over a large bottom area surface structure and finally the flow is sucked by the fan(s) and exhausted back into the surroundings (or the sump); thereby the device creates suction and sucks the surface;
wherein the suction device does not need to contact the sucked surface.

24. A high flow low pressure suction device, wherein
sucking fan(s) or rotating impeller(s) attached with a base plate, facing towards a vacuum chamber formed interior of the base plate sucks air or fluid or slurries from the environment through the perimeter of the device, where the interior geometrical design of the base plate by way of two subdivided flow sections comprises turbulence zone and smooth zone;
wherein the air or fluid or slurries from the perimeter of the device enters directly into the turbulence zone which accelerates and creates turbulence to the air or fluid or slurries and experiences a sharp drop in pressure owning to the huge amount of energy loss due to turbulence created in zone and then after the air or fluid or slurries continues into the smooth zone wherein by the help of a flow diverter present at the center the smooth zone which need not touch the sucked surface, diverts and controls the flow and enables a constant cross section condition throughout the flow path faced by the air or fluid or slurries and wherein the smooth zone is designed so to keep the turbulence to a minimum and maintains the pressure over a large bottom area surface structure; and finally the flow is sucked by the fan(s) and exhausted back into the surroundings (or the sump); thereby the device creates suction and sucks the surface;
wherein the suction device does not need to contact the sucked surface.

25. A high flow low pressure suction device, wherein
sucking fan(s) or rotating impeller(s) attached with a base plate, facing towards a vacuum chamber formed interior of the base plate sucks air or fluid or slurries from the environment through the perimeter of the device, where the interior geometrical design of the base plate by way of four subdivided flow sections comprises two acceleration zones, one turbulence zone and one smooth zone;
wherein the air or fluid or slurries from the perimeter of the device enters straight into the first acceleration zone where the air or fluid or slurries is accelerated and then goes to the turbulence zone wherein the air or fluid or slurries experiences a sharp drop in pressure owning to the huge amount of energy loss due to turbulence created in zone then again flows into a second acceleration zone and then after the air or fluid or slurries continues into the smooth zone, wherein by the help of a flow diverter present at the center of the smooth zone which need not touch the sucked surface, diverts and controls flow and enables a constant cross section condition throughout the flow path faced by the air or fluid or slurries and wherein the smooth zone maintains the pressure over a large bottom area surface structure and finally the flow is sucked by the fan(s) and exhausted back into the surroundings (or the sump); thereby the device creates suction and sucks the surface;
wherein the suction device does not need to contact the sucked surface.

* * * * *